United States Patent
Stevenson

(10) Patent No.: US 10,221,905 B2
(45) Date of Patent: Mar. 5, 2019

(54) BRIDGED CLIP RETAINER FOR BRAKE SYSTEM

(71) Applicant: GOODRICH CORPORATION, Charlotte, NC (US)

(72) Inventor: John A. Stevenson, Beavercreek, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 15/346,951

(22) Filed: Nov. 9, 2016

(65) Prior Publication Data

US 2018/0128331 A1    May 10, 2018

(51) Int. Cl.

| F16D 55/36 | (2006.01) |
|---|---|
| F16D 65/097 | (2006.01) |
| F16D 55/40 | (2006.01) |
| F16D 65/12 | (2006.01) |
| F16D 65/847 | (2006.01) |
| F16D 65/02 | (2006.01) |
| F16D 55/00 | (2006.01) |
| F16D 65/78 | (2006.01) |

(52) U.S. Cl.
CPC ......... *F16D 65/0978* (2013.01); *F16D 55/36* (2013.01); *F16D 55/40* (2013.01); *F16D 65/126* (2013.01); *F16D 65/128* (2013.01); *F16D 65/847* (2013.01); *F16D 2055/0058* (2013.01); *F16D 2065/1372* (2013.01); *F16D 2065/785* (2013.01)

(58) Field of Classification Search
CPC ............. F16D 2065/1396; F16D 65/12; F16D 65/126; F16D 2065/1372; F16D 2065/1392; F16D 55/36; F16D 55/44; F16D 55/025
See application file for complete search history.

(56) References Cited

U.S. PATENT DOCUMENTS

| 3,650,357 A * | 3/1972 | Nelson | F16D 55/24 188/251 R |
|---|---|---|---|
| 3,907,076 A * | 9/1975 | Crossman | F16D 65/121 188/218 XL |
| 3,972,395 A * | 8/1976 | Jannasch | F16D 55/40 188/218 XL |
| 4,007,814 A * | 2/1977 | Berger | F16D 65/121 188/218 XL |
| 4,013,147 A * | 3/1977 | Anderson | F16D 65/121 188/218 XL |

(Continued)

FOREIGN PATENT DOCUMENTS

| EP | 1988305 | 11/2008 |
|---|---|---|
| EP | 2000694 | 12/2008 |

(Continued)

OTHER PUBLICATIONS

European Patent Office, European Search Report dated Apr. 26, 2018 in Application No. 17200264.4-1012.

*Primary Examiner* — Nicholas J Lane
(74) *Attorney, Agent, or Firm* — Snell & Wilmer L.L.P.

(57) ABSTRACT

The clip retainer may include a first segment, a second segment extending substantially parallel to the first segment, and a bridge segment extending substantially perpendicularly between the first segment and the second segment. In various embodiments, the clip retainer is a unitary, monolithic structure.

15 Claims, 5 Drawing Sheets

(56) References Cited

U.S. PATENT DOCUMENTS

| | | | | |
|---|---|---|---|---|
| 4,465,165 A | * | 8/1984 | Bok | .............. F16D 65/126 |
| | | | | 188/218 XL |
| 4,557,356 A | * | 12/1985 | Petersen | ............ F16D 65/126 |
| | | | | 188/218 XL |
| 5,560,452 A | * | 10/1996 | Labougle | ........... F16D 65/126 |
| | | | | 188/218 XL |
| 6,419,056 B1 | | 7/2002 | Dyko | |
| 7,802,758 B2 | * | 9/2010 | Cress | ................ F16D 55/36 |
| | | | | 188/73.2 |
| 2016/0279710 A1 | * | 9/2016 | Whittle | .............. B22F 3/1055 |
| 2017/0130791 A1 | * | 5/2017 | Tremblay | ............ F16D 65/12 |

FOREIGN PATENT DOCUMENTS

| | | |
|---|---|---|
| EP | 3072610 | 9/2016 |
| WO | 2005106279 | 11/2005 |

\* cited by examiner

BRIDGED CLIP RETAINER FOR BRAKE SYSTEM

FIELD

The present disclosure relates to braking systems, and more specifically, to floating clip retainers of braking systems.

BACKGROUND

Aircraft generally include one or more landing gear having wheels for supporting the aircraft while the aircraft is not airborne. Aircraft generally include a braking system to aid in reducing forward velocity of the aircraft during taxi and landing. Conventional aircraft braking systems generally include retention devices that hold protective inserts (commonly referred to as "clips") between adjacent rotor drive lugs of a rotor. These conventional retention devices can be used to retain the clip in place. However, these conventional retention devices, if not properly mounted to the rotor drive lugs, can bend, flex, and/or break during operation of the braking system. Properly mounting conventional retention devices is especially difficult in systems in which portions of the rotor drive lug are removed for heat transfer benefits, thereby limiting the area available for mounting the retention devices to the rotor drive lugs.

SUMMARY

Disclosed herein, according to various embodiments, is a clip retainer for a brake system. The clip retainer may include a first segment, a second segment extending substantially parallel to the first segment, and a bridge segment extending substantially perpendicularly between the first segment and the second segment.

In various embodiments, the clip retainer is a unitary, monolithic structure. In various embodiments, the first segment includes a first middle portion and first circumferentially lateral portions (e.g., two portions positioned on opposite, circumferentially lateral sides of the first middle portion. The second segment, according to various embodiments, includes a second middle portion and second circumferentially lateral portions. The bridge segment may extend between the first middle portion and the second middle portion.

In various embodiments, a middle radial dimension of the first middle portion and the second middle portion is comparatively less than a lateral radial dimension of the first circumferentially lateral portions and the second circumferentially lateral portions. For example, the first circumferentially lateral portions and the second circumferentially lateral portions may include an aperture for receiving a fastener. In various embodiments, the first middle portion and the second middle portion each include a continuous outer surface. In various embodiments, the middle radial dimension is comparatively less than a diameter of the aperture.

According to various embodiments, a bridge radial dimension of the bridge segment is comparatively less than a middle radial dimension of the first middle portion and the second middle portion. In various embodiments, a radially outward surface of the bridge segment is substantially flush with a radially outward edge of the first middle portion and the second middle portion.

Also disclosed herein, according to various embodiments, is a brake system. The brake system may include a rotor that includes a rotor drive lug having a first axial side, a second axial side, and radially outward surface. The brake system may also include a clip disposed in a circumferential gap between the rotor drive lug and an adjacent rotor drive lug. The brake system may include a clip retainer for radially retaining the clip in the circumferential gap. The clip retainer may include a first segment disposed on the first axial side of the rotor drive lug, a second segment disposed on the second axial side of the rotor drive lug, and a bridge segment disposed on the radially outward surface of the rotor drive lug and extending axially between the first segment and the second segment.

According to various embodiments, the clip retainer is a unitary, monolithic structure. In various embodiments, the radially outward surface of the rotor drive lug has a scalloped indentation and the first segment and the second segment of the clip retainer each comprises a radially outward edge that substantially follows the scalloped indentation. In various embodiments, the first segment comprises a first middle portion and first circumferentially lateral portions. The second segment may include a second middle portion and second circumferentially lateral portions. The bridge segment may extend between the first middle portion and the second middle portion.

According to various embodiments, the rotor drive lug includes two axially extending through-holes. In such embodiments, the first circumferentially lateral portions and the second circumferentially lateral portions comprise apertures that align with the two axially extending through-holes. Further, the brake system may further include two fasteners respectively extending through the two axially extending through-holes and through the apertures.

In various embodiments, a middle radial dimension of the first middle portion and the second middle portion is less than a lateral radial dimension of the first circumferentially lateral portions and the second circumferentially lateral portions. In various embodiments, the middle radial dimension is less than a diameter of a head of the two fasteners. In various embodiments, the radially outward surface of the rotor drive lug includes an axially extending groove through which the bridge segment extends. In various embodiments, a radially outward surface of the bridge segment is substantially flush with the radially outward surface of the rotor drive lug.

Also disclosed herein, according to various embodiments, is a method of installing a clip retainer of a brake system. The method may include positioning a first segment and a second segment of the clip retainer on a first axial side and a second axial side, respectively, of a rotor drive lug of the brake system. The method may also include positioning a bridge segment of the clip retainer within an axially extending groove formed in a radially outward surface of the rotor drive lug. Still further, the method may include inserting two fasteners through apertures in circumferentially lateral portions of the first segment and the second segment and inserting the two fasteners respectively through two axially extending through-holes of the rotor drive lug. In various embodiments, the clip retainer is a unitary, monolithic structure and positioning the first segment and the second segment of the clip retainer on the first axial side and the second axial side, respectively of the rotor drive lug of the brake system occurs substantially simultaneously as the positioning the bridge segment of the clip retainer within the axially extending groove formed in the radially outward surface of the rotor drive lug.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
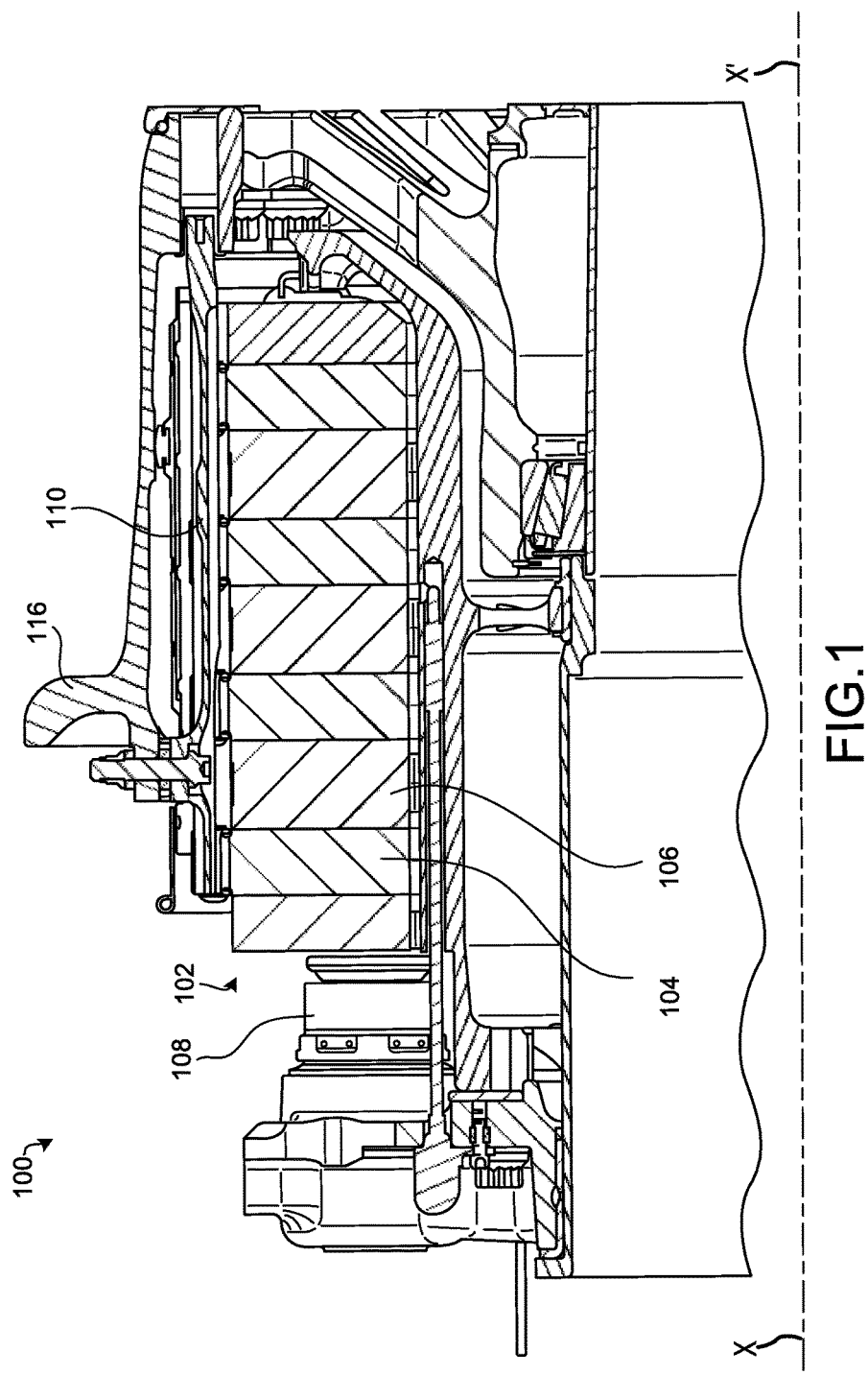
FIG. 1 illustrates a cross-sectional view of a brake system, in accordance with various embodiments.

Referring to FIG. 1, a brake system 100 in accordance with various embodiments includes a plurality of disks 102. Although this disclosure includes numerous details and references to an aircraft braking system, the features disclosed herein may be used with other, non-aircraft braking systems, such as car braking systems or the like.

The plurality of disks 102 includes at least one stator 106 and at least one rotor 104 that rotate about an axis X-X' relative to stators 106. The rotors 104 are coupled to an aircraft wheel 116, or wheel 116, via a rotor drive bar 110. Torque of aircraft wheel 116 is transferred to rotors 104 via rotor drive bar 110, and vice versa. The brake system 100 also includes an actuator 108. The actuator 108 may be actuated to compress plurality of disks 102, thereby causing friction between rotors 104 and stators 106, thus reducing the angular velocity of aircraft wheel 116.

Figure 2:
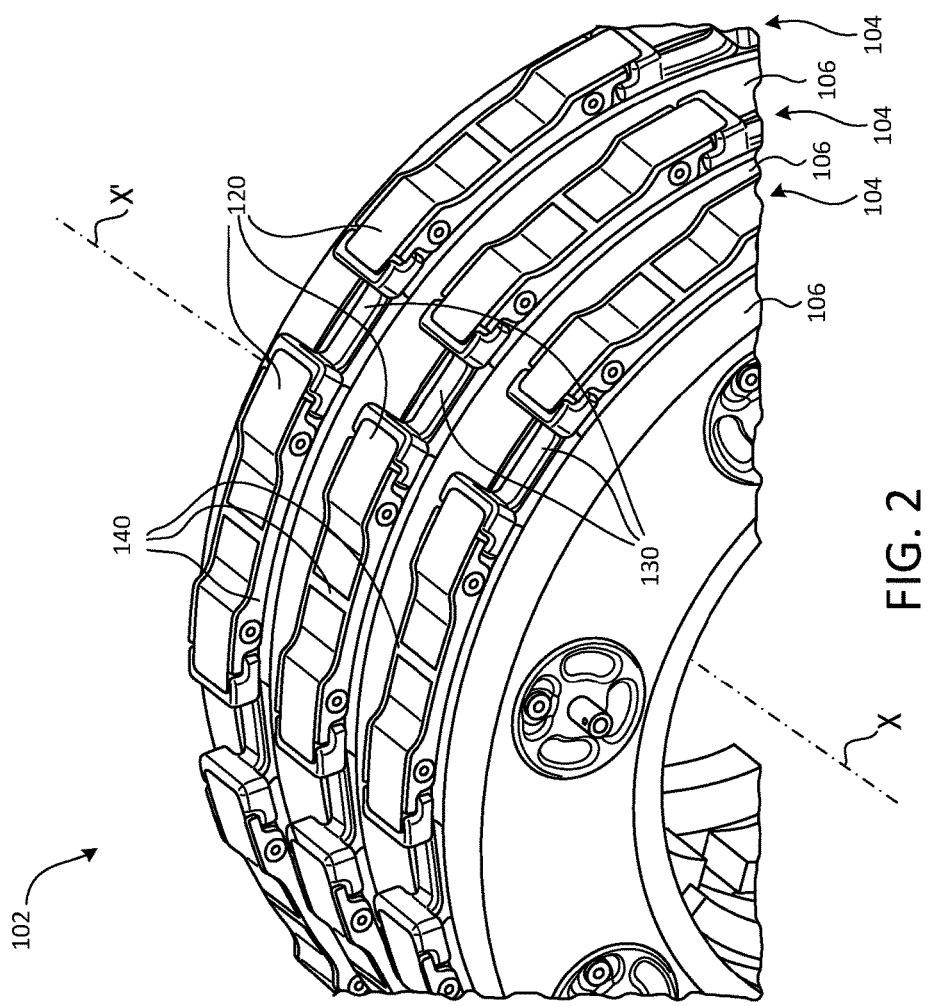
FIG. 2 illustrates a perspective view of a plurality of rotors and stators of the brake system, in accordance with various embodiments.

As mentioned above and with reference to FIG. 2, the brake system 100 may include one or more clip retainers 140 that hold one or more clips 130 in a circumferential gap 119 (with momentary reference to FIG. 3) between adjacent rotor drive lugs 118, 120 (with reference to FIG. 3) of a rotor 104. In various embodiments, the clip retainer 140 is used to retain the clip 130 in a radial direction while still allowing the clip 130 to move circumferentially, at least partially, within the circumferential gap 119 (with reference to FIG. 3) between adjacent rotor drive lugs 118, 120 (e.g., allowing the clip to "float"). The clip retainer 140 has a generally arcuate shape that follows/conforms to the arcuate shape of the rotor drive lug 120 to which it is mounted.

Figure 3:
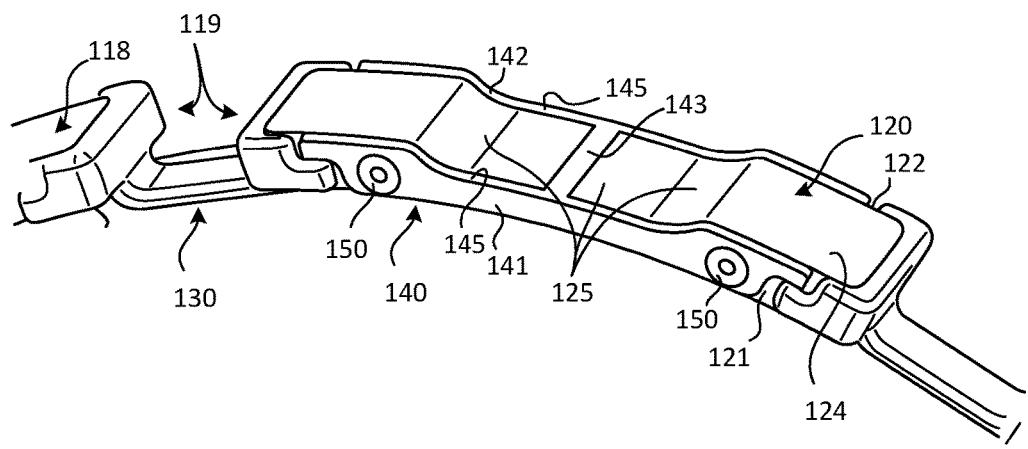
FIG. 3 illustrates a magnified perspective view of a rotor of FIG. 2, showing a rotor drive lug, a clip, and a clip retainer, in accordance with various embodiments.

With reference to FIG. 3 and according to various embodiments, the clip retainer 140 of the present disclosure includes a first segment 141, a second segment 142 that extends substantially parallel to the first segment 141, and a bridge segment 143 that extends substantially perpendicularly between the first segment 141 and the second segment 142. The clip retainer 140 may be a unitary, monolithic structure and thus the first segment 141, the second segment 142, and the bridge segment 143 may be integrally formed together. The clip retainer 140 may be manufactured via various methods, including stamping, molding, casting, etc. The clip retainer 140 may be made from various materials, such as steel, stainless steel, titanium, titanium-based alloy, cobalt, cobalt-based alloys, nickel, or nickel-based alloy.

With reference to FIG. 3 and according to various embodiments, the first segment 141 of the clip retainer 140 is disposed, in an installed state, on or substantially directly adjacent to a first axial side 121 of the rotor drive lug 120, the second segment 142 of the clip retainer 140 is disposed on or substantially directly adjacent to a second side 122 of the rotor drive lug 120, and the bridge segment 143 is disposed on a radially outward surface 124 of the rotor drive lug 120. Accordingly, the clip retainer 140 may be installed so as to fit substantially around portions of the rotor drive lug 120.

The rotor drive lug 120, according to various embodiments, has a scalloped indentation 125 formed in the radially outward surface 124. The scalloped indentation 125 may provide various heat transfer benefits to the brake system 100. For example, the scalloped indentation 125 may allow increased airflow over the rotors 104, thereby increasing the ability of heat to be dissipated and thereby improving the useful life of various components of the brake system 100. The reduced size of the rotor drive lug 120 due to the scalloped indentation 125 would potentially cause problems for conventional clip retention devices because there may not be sufficient space radially inward of the scalloped indentation 125 on the rotor drive lug 120 to form a through-hole for a fastener of a conventional clip retention device.

The integrally formed bridge segment 143 of the clip retainer 140 of the present disclosure axially extends across the radially outward surface 124 of the scalloped indentation 125. Accordingly, the bridge segment 143 prevents the clip retainer 140 from bending axially outward away from the axial sides 121, 122 of the rotor drive lug 120. In various embodiments, the first segment 141 and the second segment 142 of the clip retainer 140 each include a radially outward edge 145 that substantially follows, matches, and/or contours the shape/geometry of the scalloped indentation 125.

In various embodiments, an axially extending groove may be formed in the radially outward surface 124 and the bridge segment 143 may be fit within the groove. Accordingly, the air flow and heat transfer characteristics imparted to the brake system 100 by the scalloped indentation 125 may not be inhibited by the clip retainer 140. For example, the radially outward edge 145 of the first and second segments 141, 142 and the radially outward surface 144 (with reference to FIG. 4) may be substantially flush with scalloped indentation 125 formed in the radially outward surface 124 of the rotor drive lug 120, thereby allowing ambient heat transfer air to flow across the radially outward surface 124 without obstruction from the clip retainer 140.

Figure 4:
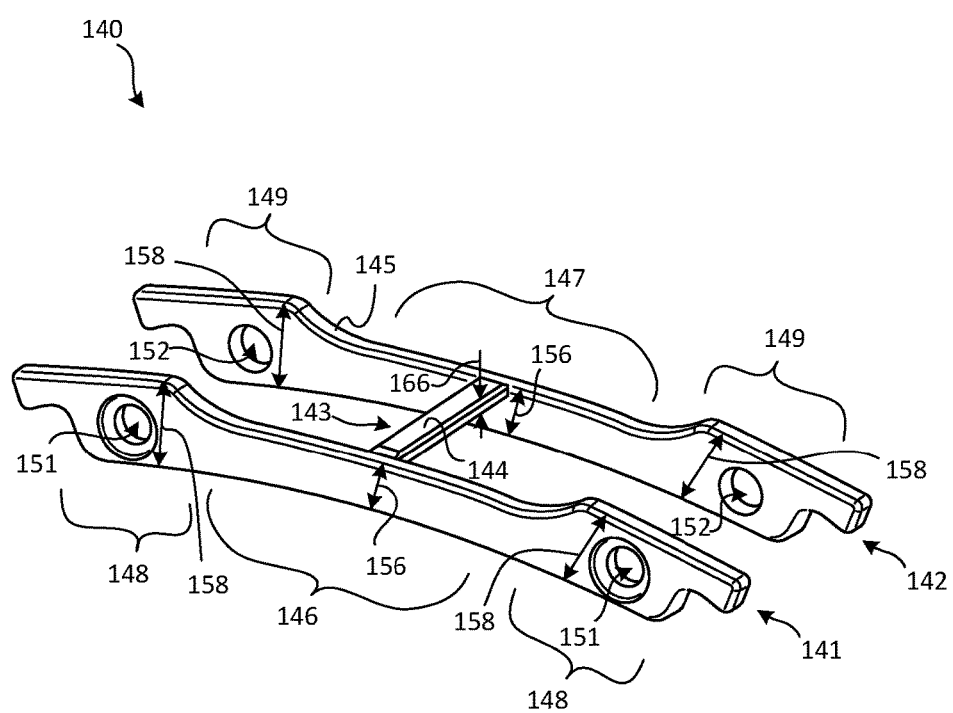
FIG. 4 illustrates a perspective view of a clip retainer, in accordance with various embodiments.

With reference to FIG. 4 and according to various embodiments, the first segment 141 of the clip retainer 140 includes a first middle portion 146 and the second segment 142 of the clip retainer 140 includes a second middle portion 147. These middle portions 146, 147 of the first and second segments 141, 142, respectively, may correspond to, for example, the region of the rotor drive lug 120 in the vicinity of the scalloped indentation 125. The first segment 141 may include first circumferentially lateral portions 148 and the second segment 142 may include second circumferentially lateral portions 149. In various embodiments, the bridge segment 143 extends between the first middle portion 146 and the second middle portion 147.

The first circumferentially lateral portions 148 of the first segment 141 may define first apertures 151 that are aligned with corresponding second apertures 152 defined in the second circumferentially lateral portions 149 of the second segment 142. That is, the clip retainer 140 may have aligned apertures 151, 152 that are defined in circumferentially lateral portions 148, 149 of the first and second segments 141, 142 through which fasteners 150 (with brief reference to FIG. 3) may be inserted. As described in greater detail below with reference to FIG. 5, the fasteners 150, which may be rivets, bolts, etc., may extend through the apertures 151, 152 and through corresponding axially extending through-holes formed in the rotor drive lug 120. Thus, the clip retainer 140 of the present disclosure may be retained against the axial surfaces 121, 122 of the rotor drive lug 120 via two fasteners 150 and the bridge segment 143. That is, the fasteners 150 may help to prevent the circumferentially lateral portions 148, 149 of the first and second segments 141, 142 from bending axially outwards away from the rotor drive lug 120 and the bridge segment 143 may help to prevent the middle portions 146, 147 of the first and second segments 141, 142 from bending axially outwards away from the rotor drive lug 120.

As described above and according to various embodiments, a middle radial dimension 156 of the first and second middle portions 146, 147 is comparatively less than a lateral radial dimension 158 of the first and second circumferentially lateral portions 148, 149. Because the comparatively reduced middle radial dimension 156 of the middle portions 146, 147 of the clip retainer 140, the first middle portion 146 and the second middle portion 147 of the first segment 141 and the second segment 142, respectively, may be non-apertured. In other words, the middle portions 146, 147 of the first and second segments 141, 142 may have a continuous outer surface and thus may be solid sections of material and may be free of holes or apertures extending axially therethrough. In various embodiments, the middle radial dimension 156 is comparatively less than a diameter of the apertures 151, 152. In various embodiments, the middle radial dimension 156 is less than a diameter of a head of the fasteners 150.

According to various embodiments, a bridge radial dimension 166 (i.e., the dimension of the bridge segment 143 in the radial direction) is comparatively less than the middle radial dimension 156 of the first and second middle portions 146, 147 of the first and second segments 141, 142 of the clip retainer 140. Accordingly, the radially outward surface 144 of the bridge segment 143, as discussed above, may be substantially flush with the radially outward edge 145 of the first middle portion 146 and the second middle portion 147 of the first segment 141 and the second segment 142, respectively.

Figure 5:
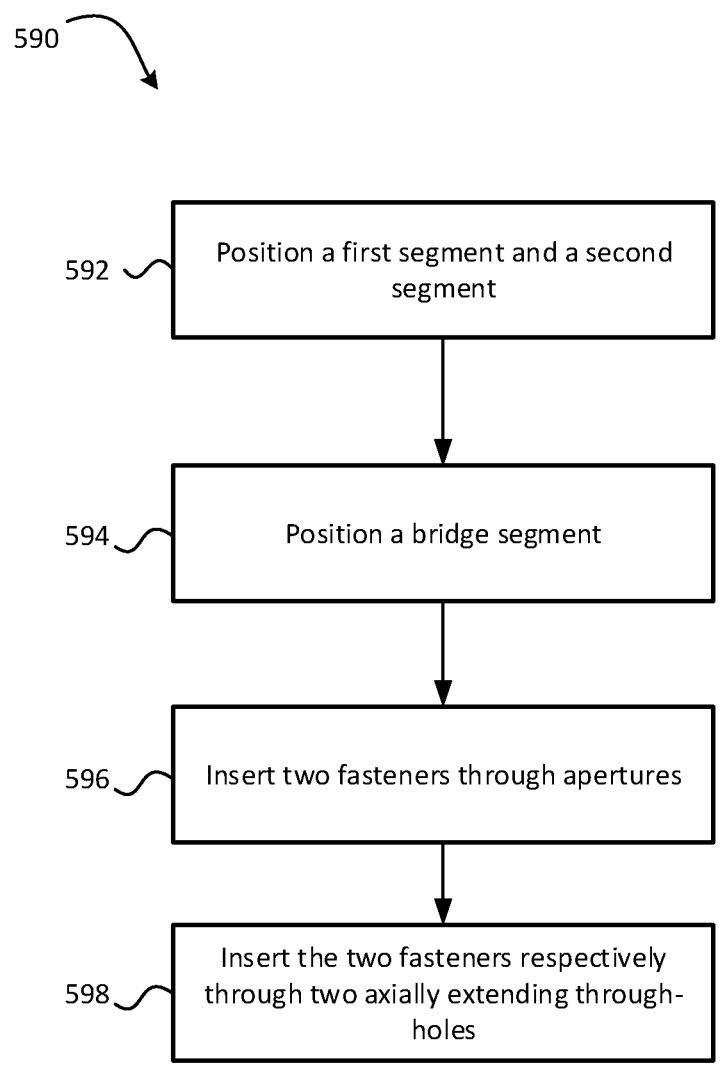
FIG. 5 illustrates a schematic flow chart diagram of a method of installing a clip retainer, in accordance with various embodiments.

With reference to FIG. 5, and according to various embodiments, a method 590 of installing the clip retainer 140 of the brake system 100 is disclosed. The method 590 may include positioning the first segment 141 and the second segment 142 of the clip retainer 140 on the first axial side 121 and the second axial side 122, respectively, of the rotor drive lug 120 at step 592. The method 590 may also include positioning the bridge segment 143 of the clip retainer 140 within an axially extending groove formed in the radially outward surface of the rotor drive lug 120 at step 594. Further, the method 590 may include inserting two fasteners 150 through apertures 151, 152 in circumferentially lateral portions 148, 149 of the first segment 141 and the second segment 142 at step 596 and inserting the two fasteners 150 respectively through two axially extending through-holes of the rotor drive lug 120 at step 598. In various embodiments, the clip retainer 140 is a unitary, monolithic structure and thus steps 592 and 594 may occur substantially simultaneously.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosure is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A clip retainer for a brake system comprising:
   a first segment comprising a first middle portion and first circumferentially lateral portions;
   a second segment extending substantially parallel to the first segment and comprising a second middle portion and second circumferentially lateral portions; and
   a bridge segment extending substantially perpendicularly between the first middle portion of the first segment and the second middle portion of the second segment;
   wherein the bridge segment is an exclusive structure extending between the first segment and the second segment;
   wherein gaps are defined between the first circumferentially lateral portions and the second circumferentially lateral portions such that the bridge segment extending between only the first middle portion and the second middle portion is the only structure of the clip retainer extending between the first segment and the second segment;
   wherein the first middle portion and the second middle portion have a middle radial dimension that is uniform along a first circumferential dimension of the first middle portion and the second middle portion;
   wherein the middle radial dimension is comparatively less than a lateral radial dimension of the first circumferentially lateral portions and the second circumferentially lateral portions; and
   wherein a second circumferential dimension of the bridge segment is less than the first circumferential dimension.

2. The clip retainer of claim 1, wherein the clip retainer is a unitary, monolithic structure.

3. The clip retainer of claim 1, wherein the first circumferentially lateral portions and the second circumferentially lateral portions comprise an aperture for receiving a fastener.

4. The clip retainer of claim 3, wherein the first middle portion and the second middle portion each comprise a continuous outer surface.

5. The clip retainer of claim 3, wherein the middle radial dimension is comparatively less than a diameter of the aperture.

6. The clip retainer of claim 1, wherein a bridge radial dimension of the bridge segment is comparatively less than the middle radial dimension of the first middle portion and the second middle portion.

7. A brake system comprising:
   a rotor comprising a rotor drive lug having a first axial side, a second axial side, and a radially outward surface, wherein an axially extending groove is defined in the radially outward surface;
   a clip disposed in a circumferential gap between the rotor drive lug and an adjacent rotor drive lug;
   a clip retainer for radially retaining the clip in the circumferential gap, the clip retainer comprising:
      a first segment disposed on the first axial side of the rotor drive lug, wherein the first segment comprises a first middle portion and first circumferentially lateral portions;
      a second segment disposed on the second axial side of the rotor drive lug, wherein the second segment comprises a second middle portion and second circumferentially lateral portions; and
      a bridge segment extending through the axially extending groove defined on the radially outward surface of the rotor drive lug and extending axially between the first middle portion of the first segment and the second middle portion of the second segment, wherein a radially outward surface of the bridge segment is substantially flush with the radially outward surface of the rotor drive lug.

8. The brake system of claim 7, wherein the clip retainer is a unitary, monolithic structure.

9. The brake system of claim 7, wherein the radially outward surface of the rotor drive lug has a scalloped indentation, wherein the first middle portion and the second middle portion each comprises a radially outward edge that substantially follows the scalloped indentation, wherein the bridge segment extends axially across the scalloped indentation.

10. The brake system of claim 9, wherein the only structure of the clip retainer that extends across the radially outward surface of the rotor drive lug is the bridge segment disposed in the scalloped indentation.

11. The brake system of claim 10, wherein:
   the rotor drive lug comprises two axially extending through-holes;
   the first circumferentially lateral portions and the second circumferentially lateral portions comprise apertures that align with the two axially extending through-holes; and
   the brake system further comprises two fasteners respectively extending through the two axially extending through-holes and through the apertures.

12. The brake system of claim 11, a middle radial dimension of the first middle portion and the second middle portion is less than a lateral radial dimension of the first circumferentially lateral portions and the second circumferentially lateral portions.

13. The brake system of claim 12, wherein the middle radial dimension is less than a diameter of a head of the two fasteners.

14. A method of installing a clip retainer of a brake system, the method comprising:
   positioning a first segment and a second segment of the clip retainer on a first axial side and a second axial side, respectively, of a rotor drive lug of the brake system;
   positioning a bridge segment of the clip retainer within an axially extending groove formed in a radially outward surface of the rotor drive lug, wherein a radially outward surface of the bridge segment is substantially flush with the radially outward surface of the rotor drive lug;

inserting two fasteners through apertures in circumferentially lateral portions of the first segment and the second segment; and inserting the two fasteners respectively through two axially extending through-holes of the rotor drive lug.

15. The method of claim 14, wherein:

the clip retainer is a unitary, monolithic structure; and the positioning the first segment and the second segment of the clip retainer on the first axial side and the second axial side, respectively of the rotor drive lug of the brake system occurs substantially simultaneously as the positioning the bridge segment of the clip retainer within the axially extending groove formed in the radially outward surface of the rotor drive lug.

\* \* \* \* \*